US011874621B2

(12) United States Patent
Kawanago

(10) Patent No.: US 11,874,621 B2
(45) Date of Patent: Jan. 16, 2024

(54) IMAGE FORMING SYSTEM, IMAGE FORMING APPARATUS, AND RECORDING MEDIUM

(71) Applicant: Konica Minolta, Inc., Tokyo (JP)

(72) Inventor: Takashi Kawanago, Fuchu (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 17/858,992

(22) Filed: Jul. 6, 2022

(65) Prior Publication Data

US 2023/0069003 A1 Mar. 2, 2023

(30) Foreign Application Priority Data

Aug. 26, 2021 (JP) ................................ 2021-137705

(51) Int. Cl.
*G03G 15/00* (2006.01)
*G03G 15/20* (2006.01)

(52) U.S. Cl.
CPC ..... *G03G 15/5045* (2013.01); *G03G 15/2039* (2013.01); *G03G 15/5029* (2013.01); *G03G 15/5054* (2013.01); *G03G 15/2053* (2013.01)

(58) Field of Classification Search
CPC ........... G03G 15/2053; G03G 15/2039; G03G 15/5029; G03G 15/5054; G03G 15/5045
See application file for complete search history.

(56) References Cited

U.S. PATENT DOCUMENTS

2006/0275046 A1* 12/2006 Cao .................... G03G 15/6573 399/68
2010/0008683 A1* 1/2010 Yoshikawa ........ G03G 15/2039 399/45
2015/0261149 A1* 9/2015 Seshita ............. G03G 15/2042 399/68
2016/0259277 A1* 9/2016 Umeno ................ G03G 15/652

FOREIGN PATENT DOCUMENTS

JP H08-160686 A 6/1996

* cited by examiner

*Primary Examiner* — Stephanie E Bloss
*Assistant Examiner* — Michael A Harrison
(74) *Attorney, Agent, or Firm* — Osha Bergman Watanabe & Burton LLP

(57) ABSTRACT

An image forming system includes: an image forming apparatus that includes a transfer device that transfers a toner image onto a sheet and a fixing device that fixes the toner image; a sheet heating device that heats the sheet on an upstream of the fixing device in a sheet conveyance direction; a first detector that detects a temperature inside the image forming apparatus; a second detector that detects a temperature of the sheet before the sheet heating device heats the sheet; and a controller that causes the sheet heating device to heat the sheet based on a detection result by the second detector and a sheet passing condition of the sheet, and corrects at least one of a transfer current and a transfer voltage in the transfer device based on a detection result by the first detector in a case where the sheet heating device heats the sheet.

10 Claims, 6 Drawing Sheets

FIG.7A

| | SHEET TYPE | | | | |
|---|---|---|---|---|---|
| BASIS WEIGHT gsm | PLAIN PAPER | HIGH-QUALITY PAPER | GLOSSY COATED PAPER | MATT COATED PAPER | EMBOSSED PAPER |
| 52-61 | ··· | ··· | ··· | ··· | ··· |
| 62-74 | ··· | ··· | ··· | ··· | ··· |
| 75-80 | ··· | ··· | ··· | ··· | ··· |
| 81-91 | ··· | ··· | ··· | ··· | ··· |
| 92-105 | ··· | ··· | ··· | ··· | ··· |
| 106-135 | ··· | ··· | ··· | ··· | ··· |
| 136-176 | ··· | ··· | ··· | ··· | ··· |
| 177-216 | ··· | ··· | ··· | ··· | ··· |
| 217-256 | ··· | ··· | ··· | ··· | ··· |
| 257-300 | ··· | ··· | −180 μA | ··· | ··· |
| 301-350 | ··· | ··· | ··· | ··· | ··· |
| 351-400 | ··· | ··· | ··· | ··· | ··· |

FIG.7B

| DIFFERENCE BETWEEN TEMPERATURE INSIDE APPARATUS AND TEMPERATURE IN VICINITY OF TRANSFER SECTION | | | |
|---|---|---|---|
| 5℃ | 10℃ | 15℃ | 20℃ |
| ··· | +10 μA | ··· | ··· |

FIG.7C

| DIFFERENCE BETWEEN SHEET TEMPERATURES BEFORE AND AFTER HEATING | | | | | |
|---|---|---|---|---|---|
| 5℃ | 10℃ | 15℃ | 20℃ | 25℃ | 30℃ |
| ··· | ··· | +12 μA | ··· | ··· | ··· |

IMAGE FORMING SYSTEM, IMAGE FORMING APPARATUS, AND RECORDING MEDIUM

CROSS-REFERENCE TO RELATED APPLICATIONS

The entire disclosure of Japanese Patent Application No. 2021-137705 filed on Aug. 26, 2021 is incorporated herein by reference.

BACKGROUND

1. Technical Field

The present invention relates to an image forming system, an image forming apparatus, and a recording medium.

2. Description of Related Art

Conventionally, an image forming apparatus such as a printer or a copying machine adopting an electrophotographic system is widely used. Such an image forming apparatus generally writes an electrostatic latent image by irradiating a photosensitive drum whose surface is uniformly charged with a laser beam by an optical device. The image forming apparatus develops the electrostatic latent image by using toners in the developing device. The image forming apparatus transfers the developed toner image onto a sheet via an intermediate transfer belt, and thereafter fixes the transferred toner image on the sheet. The image forming apparatus performs image formation processing through this series of processes.

When such an image forming apparatus is used under a low-temperature and low-humidity environment or a high-temperature and high-humidity environment, environmental fluctuation causes fluctuation in the resistance value of a transfer member or a sheet. This degrades the transferability. The fluctuation of the sheet temperature deteriorates the fixing property.

In this context, for example, Japanese Unexamined Patent Publication No. H08-160686 discloses a recording apparatus which includes heating unit for heating a sheet (medium) between a sheet feed section (hopper) and a transfer section (transfer device) for transferring a toner image onto the medium. According to the recording apparatus, the sheet temperature is kept constant by heating the sheet even in a low-temperature and low-humidity environment. This suppresses deterioration of transferability and fixing property.

In the case where the heating unit is provided between the sheet feeding unit and the transfer section as described in Japanese Unexamined Patent Publication No. H08-160686, the heating unit heats the sheet in consideration of fixability. When the sheet passes through the transfer section, the transfer section is excessively heated. A resistance value of the transfer section fluctuates. This leads to deterioration of transferability. Due to the heat generated by the heating unit itself, the temperature of the transfer section increases, and there is a risk that the transferability will deteriorate.

In the Japanese Unexamined Patent Publication No. H08-160686, the sheet is heated in order to make the transfer voltage constant, which cannot prevent the deterioration of transferability.

SUMMARY

One or more embodiments of the present invention provide an image forming system, an image forming apparatus, and a recording medium capable of providing high-quality printed matter by suppressing deterioration of transferability of a transfer section due to an influence of heating of a sheet before fixing.

According to an aspect of the present invention, an image forming system includes:

- an image forming apparatus that includes:
  - a transfer section (i.e., transfer device) that transfers a toner image onto a sheet; and
  - a fixing section (i.e., fixing device) that fixes the toner image transferred by the transfer section to the sheet;
- a sheet heating device that heats the sheet on an upstream of the fixing section in a sheet conveyance direction;
- a first detector that detects a temperature inside the image forming apparatus;
- a second detector that detects a temperature of the sheet before heating;
- a controller that causes the sheet heating device to execute sheet heating processing based on a detection result by the second detector and a sheet passing condition of the sheet; and
- a correction section that corrects at least one of a transfer current and a transfer voltage in the transfer section based on a detection result by the first detector in a case where the sheet heating device executes the sheet heating processing.

According to another aspect of the present invention, an image forming apparatus that forms an image on a sheet heated by a sheet heating device includes:

- a transfer section that transfers a toner image onto a sheet;
- a fixing section that fixes the toner image transferred by the transfer section to the sheet;
- a detector that detects a temperature inside the apparatus;
- an acquisition section that acquires a temperature of the sheet before heating;
- a controller that causes the sheet heating device to execute sheet heating processing based on an acquisition result by the acquisition section and a sheet passing condition of the sheet; and
- a correction section that corrects at least one of a transfer current and a transfer voltage in the transfer section based on a detection result by the detector in a case where the sheet heating device executes the sheet heating processing.

According to still another aspect of the present invention, a non-transitory recording medium stores instructions for a computer of an image forming system, wherein:

- the image forming system includes:
- an image forming apparatus that includes:
  - a transfer section that transfers a toner image onto a sheet; and
  - a fixing section that fixes the toner image transferred by the transfer section to the sheet;
- a sheet heating device that heats the sheet on an upstream of a fixing section in a sheet conveyance direction;
- a first detector that detects an temperature inside the image forming apparatus; and
- a second detector that detects a temperature of the sheet before heating, and
- the instructions cause a computer of the image forming system to function as:
- a controller that causes the sheet heating device to execute sheet heating processing based on a detection result by the second detector and a sheet passing condition of the sheet; and
- a correction section that corrects at least one of a transfer current and a transfer voltage in the transfer section based on a detection result by the first detector in a case where the sheet heating device executes the sheet heating processing.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 7A is a table of setting values of a transfer current.

FIG. 7B is a first correction table.

FIG. 7C is a second correction table.

DETAILED DESCRIPTION OF EMBODIMENTS

Embodiments of the invention will be described in detail with reference to the drawings below. However, the scope of the present invention is not limited to the illustrated example.

Configuration of Image Forming System

Figure 1:
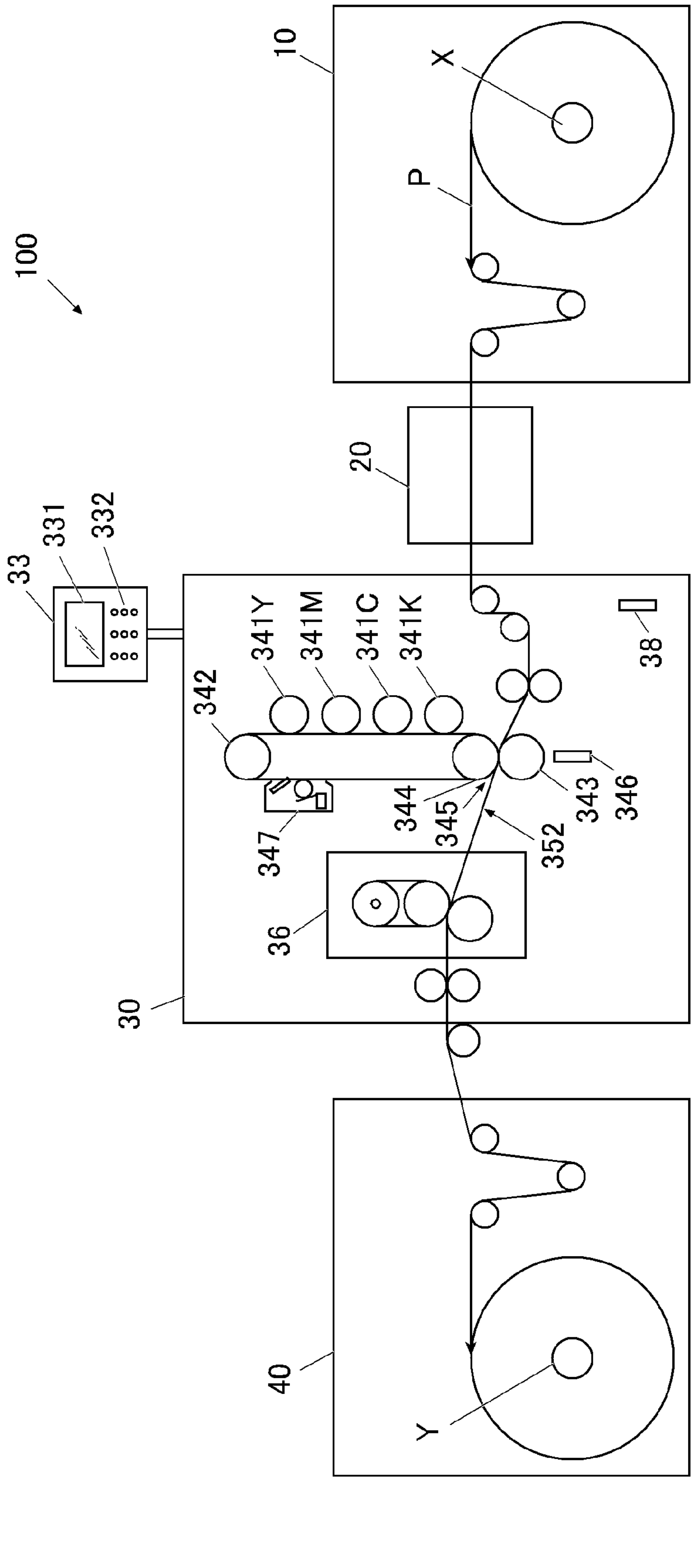
FIG. 1 shows an overall configuration example of an image forming system according to one or more embodiments of the present invention.

FIG. 1 illustrates a schematic configuration of an image forming system 100 according to one or more embodiments of the present invention. The image forming system 100 forms an image on a sheet P that is a continuous sheet such as roll sheet, roll film, and continuous form, for example.

As shown in FIG. 1, in the image forming system 100, a sheet feed device 10, a sheet heating device 20, an image forming apparatus 30, and a winding device 40 are connected from an upstream side along a conveyance direction of the sheet P (sheet conveyance direction). FIG. 1 shows a case where the sheet feed device 10, the sheet heating device 20, and the winding device 40 are configured separately from the image forming apparatus 30, but they may be configured integrally.

The sheet feed device 10 supplies the sheet P to the sheet heating device 20. The sheet feed device 10 is driven by a motor (not shown) to convey the sheet P wound around the support shaft X to the sheet heating device 20 at a constant speed. Operation of the motor of the sheet feed device 10 is controlled by a controller 31 (FIG. 4) included in the image forming apparatus 30.

The sheet heating device 20 heats the sheet P conveyed from the sheet feed device 10 and conveys the sheet P to the image forming apparatus 30.

Figure 2:
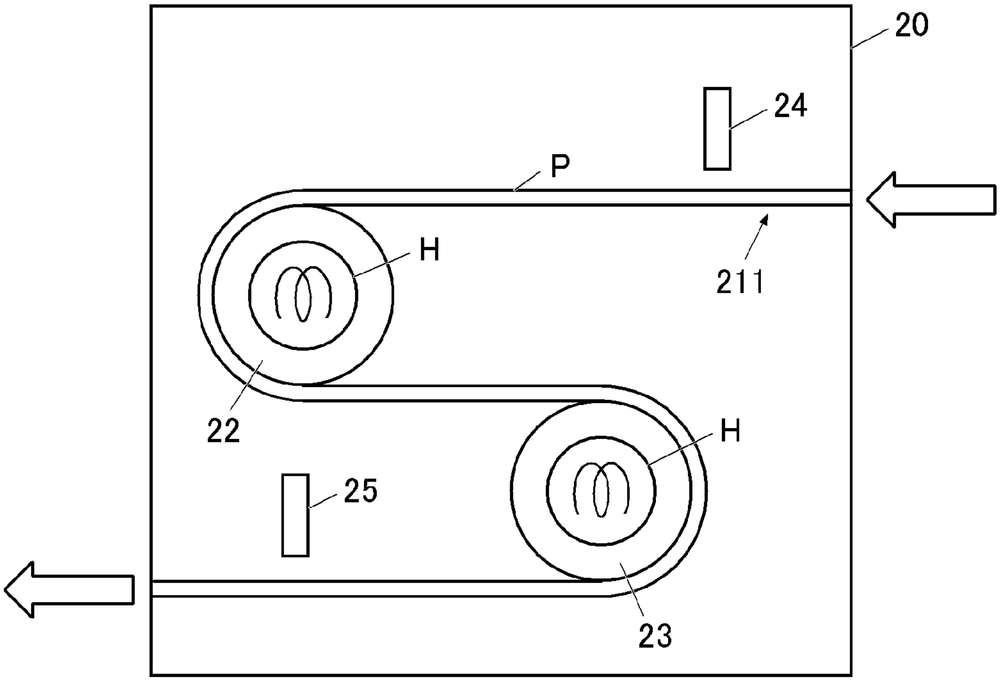
FIG. 2 shows a configuration example of a sheet heating device.

FIG. 2 shows a configuration example of the sheet heating device 20. In the example shown in FIG. 2, the sheet conveyance direction is indicated by an arrow.

The sheet heating device 20 includes, for example, a sheet conveyance section 21, a first heating unit 22, a second heating unit 23, first sheet temperature detectors 24 (second detector), and second sheet temperature detectors 25 (fourth detector).

The sheet conveyance section 21 includes a sheet passing path 211. The sheet conveyance section 21 conveys the sheet P, which has been conveyed from the sheet feed device 10 to the sheet heating device 20, to the image forming apparatus 30 under the control of the controller 31.

The first heating unit 22 and the second heating unit 23 are rollers in which a heat source H such as a halogen heater is placed inside a rotatable aluminum heat-transfer sleeve, for example.

The first heating unit 22 heats the back surface of the sheet P by coming into contact with the back surface (one surface) of the sheet P passing through the sheet passing path 211.

The second heating unit 23 heats the surface of the sheet P by coming into contact with the surface of the sheet P passing through the sheet passing path 211 (the surface opposite to the surface heated by the first heating unit 22).

The first sheet temperature detectors 24 are disposed on the upstream side of the first heating unit 22 in the sheet conveyance direction. The first sheet temperature detectors 24 detect the temperature of the surface of the sheet P before being heated by the sheet heating device 20 in a contactless manner and output the detection result to the controller 31.

Figure 3:
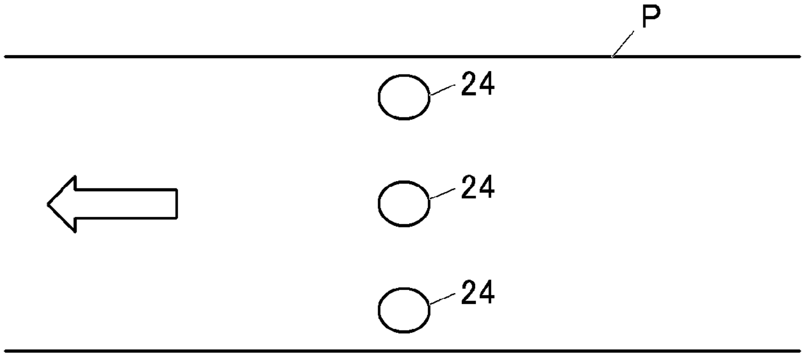
FIG. 3 is a top view schematically illustrating the first sheet temperature detectors.

FIG. 3 is a top view schematically illustrating the first sheet temperature detectors 24. In the example shown in FIG. 3, the sheet conveyance direction is indicated by an arrow.

As illustrated in FIG. 3, a plurality of first sheet temperature detectors 24 are disposed at intervals in a direction orthogonal to the sheet conveyance direction and parallel to the surface of the sheet P. In one or more embodiments, the first sheet temperature detector 24 is provided at each of the end portions and the center portion of the sheet P in the width direction thereof. However, the number of the first sheet temperature detectors 24 is not limited thereto. One or more may be provided.

The second sheet temperature detectors 25 are disposed downstream of the second heating unit 23 in the conveyance direction of the sheet P. The second sheet temperature detectors 25 detect the temperature of the surface of the sheet P heated by the sheet heating device 20 in a contactless manner and output the detection result to the controller 31.

The first sheet temperature detectors 24 and the second sheet temperature detectors 25 may adopt a contact method. However, in the contact method, a temperature difference may occur between a contacted portion and a non-contacted portion. The non-contact method may be used since the temperature can be detected more accurately.

Similarly to the first sheet temperature detectors 24, a plurality of second sheet temperature detectors 25 are arranged at intervals in the direction perpendicular to the sheet conveyance direction and parallel to the surface of the sheet P. In one or more embodiments, the second sheet temperature detector 25 is provided at each of the end portions and the center portion of the sheet P in the width direction thereof. However, the number of the second sheet temperature detectors 25 is not limited thereto. One or more may be provided.

The image forming apparatus 30 forms an image on the sheet P conveyed from the sheet heating device 20 by an intermediate transfer method utilizing an electrophotographic process technology.

Figure 4:
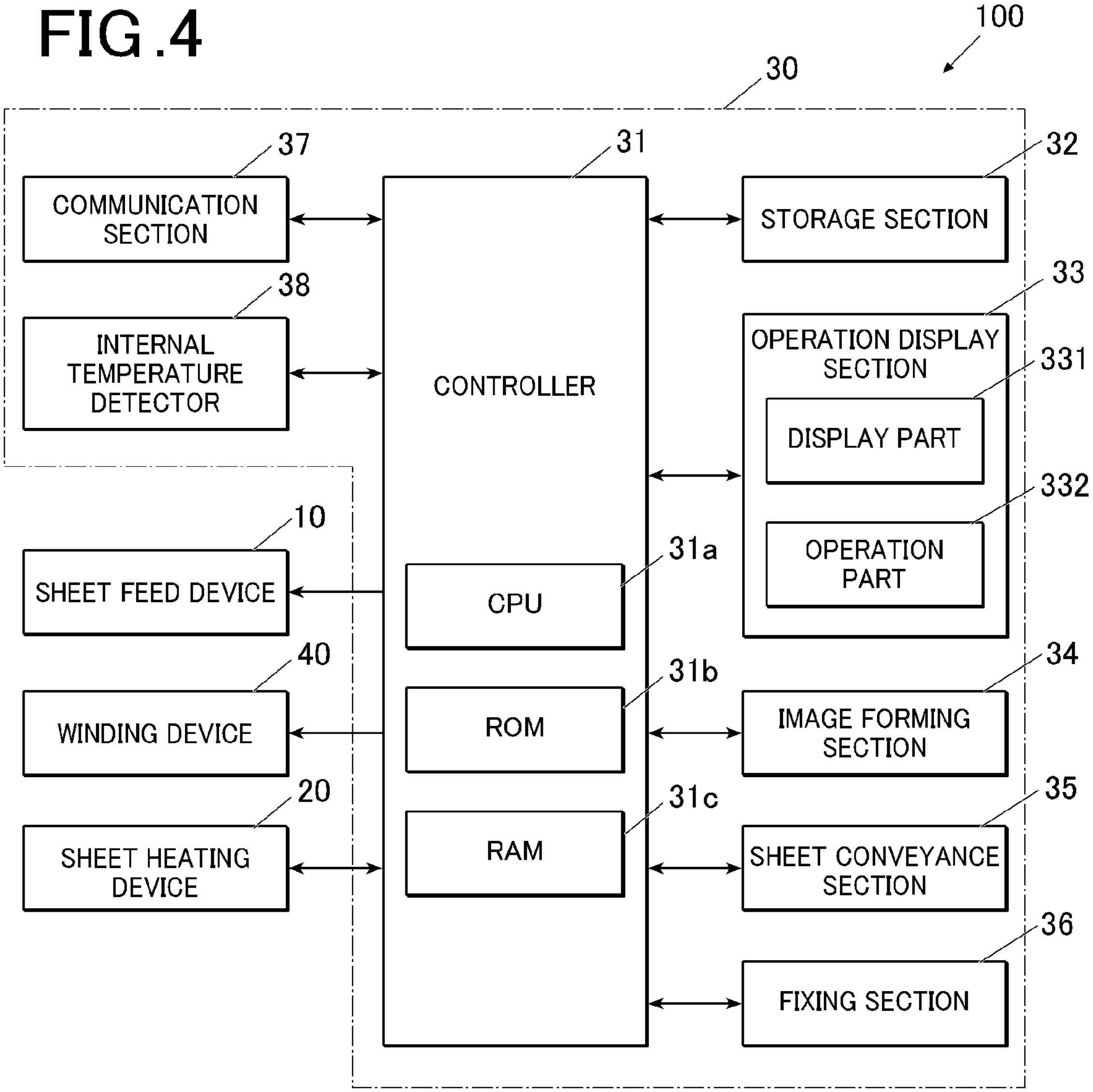
FIG. 4 illustrates a main part of a control system of the image forming system.

As illustrated in FIG. 4, the image forming apparatus 30 includes the controller 31, a storage section 32, an operation display section 33, an image forming section 34, a sheet conveyance section 35, a fixing section (fixing device) 36, and a communication section 37.

The image forming apparatus 30 includes an internal temperature detector 38 (third detector, detector) that detects an ambient temperature inside the image forming apparatus 30 (temperature inside the apparatus). When sheet heating processing is executed, in a case where a correction section described later corrects at least one of a transfer current or a transfer voltage in the transfer section based on the detection result by the first detector, the internal temperature detector 38 may be the first detector.

The internal temperature detector 38 outputs the result of detecting the temperature inside the apparatus to the controller 31.

The controller 31 includes a CPU (central processing unit) 31*a*, ROM (read only memory) 31*b*, RAM (random access memory) 31*c* and the like. The CPU 31*a* reads instructions corresponding to processing content from the ROM 31*b* and develops it in the RAM 31*c*. The CPU 31*a* cooperates with the developed instructions to comprehensively control operation of components of the image forming apparatus 30, the sheet feed device 10, the sheet heating device 20, the winding device 40, and the like.

The controller 31 causes the sheet heating device 20 to perform sheet heating processing, which will be described later, based on the detection result of the second detector (the first sheet temperature detectors 24) and the sheet passing conditions. Thus, the controller 31 functions as a controller.

In a case where the sheet heating processing is executed, the controller 31 corrects at least one of a transfer current and a transfer voltage in the transfer section (a transfer device comprising a secondary transfer roller 343 and a counter roller 344) based on the detection result by the first detector (the internal temperature detector 38 and a transfer-section temperature detector 346). Thus, the controller 31 functions as the correction section.

The controller 31 determines whether or not a value detected by the first detector (transfer-section temperature detector 346), which will be described later, is equal to or greater than a predetermined value. Thus, the controller 31 functions as a determination section.

The controller 31 acquires the temperature of the sheet P before heating from the first sheet temperature detectors 24. Thus, the controller 31 functions as an acquisition section.

The storage section 32 includes, for example, a nonvolatile semiconductor memory (so-called flash memory), a hard disk drive, or the like.

The storage section 32 stores input job information, original data, setting information of various types, image data, and the like. The job information includes a conveyance speed of the sheet P and a sheet type and a basis weight of the sheet P as sheet passing conditions.

The storage section 32 stores conditions for heating a sheet in transfer current correction processing to be described later and an amount of current to be sent to the heat source H.

The storage section 32 stores:

a threshold of the temperature at or in the vicinity of the transfer section (the result of detection by the transfer-section temperature detector 346 disposed near/close to the transfer section as described later) used in the transfer-current correction processing described later;

a threshold of the difference between the temperature inside the apparatus (the result of detection by the internal temperature detector 38) and the temperature in the vicinity of the transfer section (the result of detection by the transfer-section temperature detector 346);

a table of set values of a transfer current;

a first correction value table; and a second correction value table.

These data and the like may be stored in the RAM 31*c* of the controller 31.

The operation display section 33 is composed of, for example, a liquid crystal display (LCD) with a touch panel. The operation display section 33 functions as a display part 331 and an operation part 332.

According to a display control signal input from the controller 31, the display part 331 displays various operation screens, states of images, operation status of functions, and the like.

The operation part 332 includes various operation keys such as a numeric keypad, a start key, and the like. The operation part 332 receives various input operations from a user and outputs operation signals to the controller 31.

The image forming section 34 forms toner images of respective colors of Y (yellow), M (magenta), C (cyan), and K (black) on photoconductor drums 341Y, 341M, 341C, 341K based on image data input from an external device (personal computer or the like) via the communication section 37, for example. The image forming section 34 primary transfers them sequentially to an intermediate transfer belt 342 to superimpose the toner images in four colors. The image forming section 34 forms (prints) an image by secondarily transferring the toner image onto the sheet P conveyed from the sheet heating device 20 by the secondary transfer roller 343 and the counter roller 344.

After the secondary transfer, transfer residual toner remaining on the intermediate transfer belt 342 is removed by a cleaning section 347 on the downstream side.

The secondary transfer roller 343 and the counter roller 344 form the transfer section.

The secondary transfer roller 343 comes into contact with the counter roller 344, thereby forming a secondary transfer nip part 345.

The controller 31 controls the power source (not shown) to apply a positive voltage, whose polarity is opposite to the charge polarity of the toner, to the secondary transfer roller 343 so that a predetermined current, which is a transfer current, flows in the secondary transfer nip part 345.

The image forming section 34 includes the transfer-section temperature detector 346 (first detector, detector) that is disposed near the transfer section and detects the temperature in the vicinity of the transfer section in a contactless manner.

The transfer-section temperature detector 346 outputs a result of detecting the temperature in the vicinity of the transfer section to the controller 31.

Figure 5:
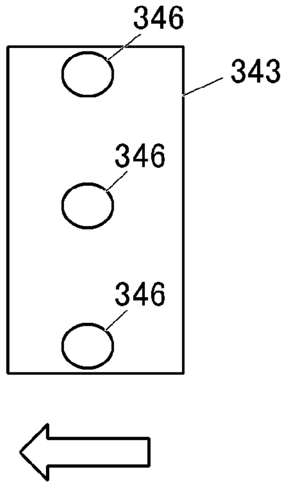
FIG. 5 is a bottom view schematically illustrating a transfer-section temperature detector.

FIG. 5 is a bottom view schematically illustrating the transfer-section temperature detector. In the example shown in FIG. 5, the sheet conveyance direction is indicated by an arrow.

As shown in FIG. 5, a plurality of transfer-section temperature detectors 346 are arranged at intervals in a direction perpendicular to the sheet conveyance direction of the secondary transfer roller 343 and parallel to the surface of the sheet P. In one or more embodiments, the transfer-section temperature detector 346 is provided at each of the end portions and the center portion of the secondary transfer roller 343 in the width direction of the sheet P. However, the number of transfer-section temperature detectors 346 is not limited to this. One or more may be provided.

The sheet conveyance section 35 includes a sheet passing path 352 including a plurality of conveyance rollers.

Under the control of the controller 31, the sheet conveyance section 35 conveys, to the image forming section 34, the sheet P conveyed from the sheet heating device 20 to the image forming apparatus 30. The sheet conveyance section 35 transports the sheet P on which the toner image is formed in the image forming section 34 to the fixing section 36. The sheet conveyance section 35 transports the sheet P to which the toner image has been fixed in the fixing section 36 to the winding device 40.

The fixing section 36 includes a fixing heater, a fixing roller, and a fixing external heating unit. The fixing section 36 thermally fixes a toner image transferred to a sheet.

The communication section 37 is constituted by a communication control card such as a LAN (local area network) card. The communication section 37 transmits/receives various types of data to/from an external device (e.g. a personal computer) connected to a communication network such as a LAN, WAN (wide area network).

The winding device 40 winds the sheet P transported from the image forming apparatus 30. The winding device 40 winds the sheet P transported from the image forming apparatus 30 around the support shaft Y at a constant speed by driving of a motor (not shown). The winding operation of the winding device 40 is controlled by the controller 31 included in the image forming apparatus 30.

Operation of Image Forming System 100

Next, operation in the image forming system 100 of one or more embodiments will be described.

Figure 6:
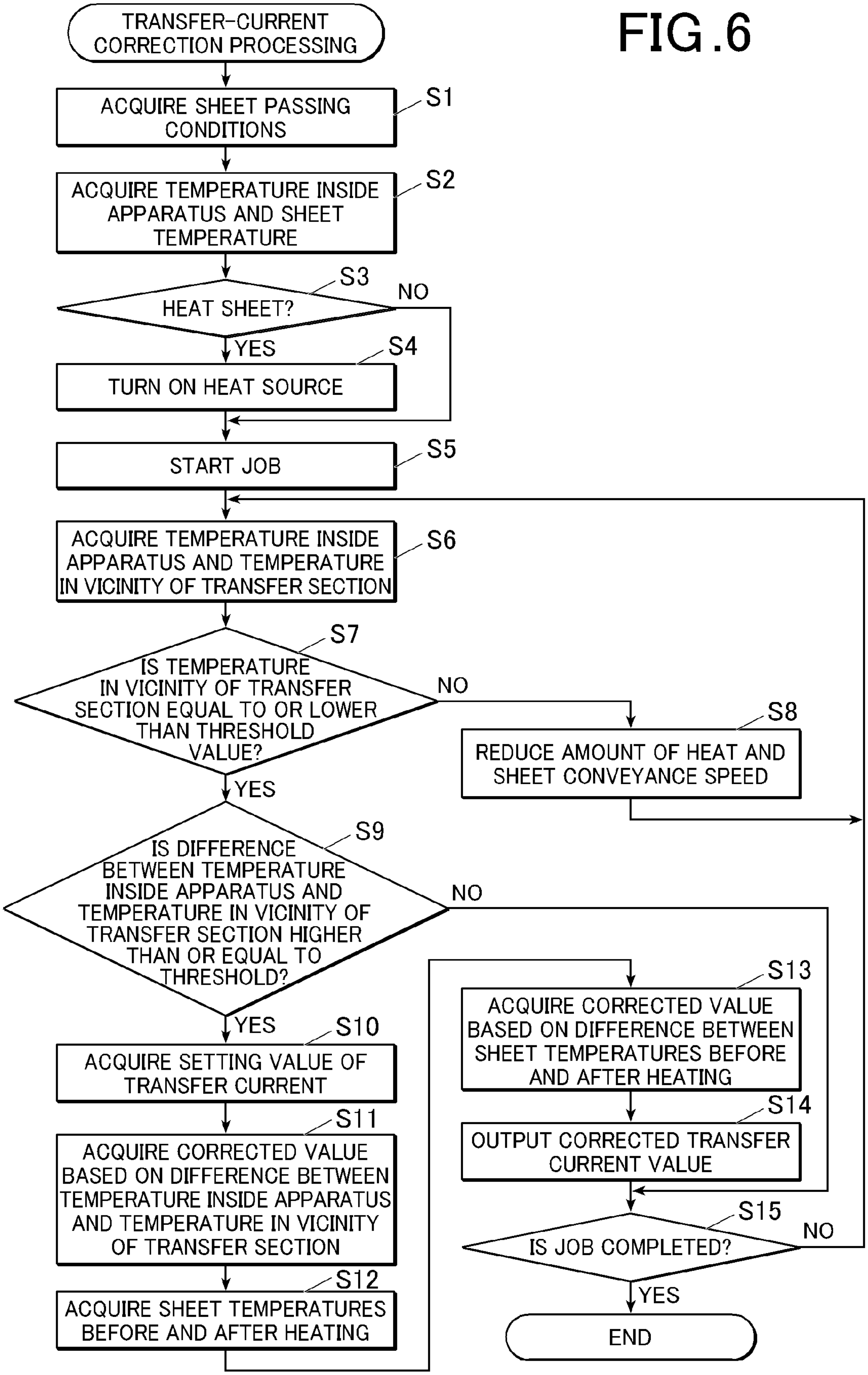
FIG. 6 is a flowchart illustrating a flow of transfer current correction processing.

FIG. 6 is a flowchart of the transfer current correction processing executed in the image forming system 100. The transfer current correction processing is executed by instructions stored in the controller 31 when the operation part 332 or the communication section 37 receives an instruction to start a job.

At the time when the transfer current correction processing is started, the heat source H of the sheet heating device 20 is off.

First, the controller 31 acquires, from the storage section 32, information on a sheet conveyance speed and a sheet type and a basis weight of the sheet P, which are sheet passing conditions of a job for which a start instruction is received (Step S1). The sheet passing conditions may include at least one of information on a sheet conveyance speed, a sheet type of the sheet P, and a basis weight of the sheet P.

Next, the controller 31 controls the internal temperature detector 38 to acquire the temperature inside the apparatus. The controller 31 controls the first sheet temperature detectors 24 to acquire the temperature of the surface of the sheet P (Step S2). The controller 31 may acquire an average value of detection results by the plurality of first sheet temperature detectors 24 as the temperature of the surface of the sheet P detected by the first sheet temperature detectors 24. Alternatively, the controller 31 may obtain the detection result of one of the plurality of first sheet temperature detectors 24.

Next, the controller 31 determines whether or not to heat the sheet P by the sheet heating device 20 (Step S3) based on:

the sheet passing conditions acquired in Step S1; and the temperature inside the apparatus and the surface temperature of the sheet P acquired in Step S2.

The sheet passing conditions, and the condition for heating the sheet P at the temperature inside the apparatus and the surface temperature of the sheet P are set in advance.

In a case where the sheet P is to be heated (YES in Step S3), the controller 31 controls the sheet heating device 20 to turn on the heat source H and heat the sheet P. The controller 31 conveys the sheet P to the image forming apparatus 30 (Step S4). The amount of current to be sent to the heat source H is set in advance by a table or the like based on the sheet passing conditions, the temperature inside the apparatus, and the temperature of the surface of the sheet P. Step S4 is the sheet heating processing.

In a case where the sheet P is not heated (NO in Step S3), the controller 31 does not heat the sheet P while keeping the heat source H off. The controller 31 conveys the sheet P to the image forming apparatus 30, and proceeds to Step S5.

Next, the controller 31 starts the job (Step S5).

Next, the controller 31 controls the internal temperature detector 38 to acquire the temperature inside the apparatus. The controller 31 controls the transfer-section temperature detector 346 to acquire a temperature in the vicinity of the transfer section (Step S6). The controller 31 may acquire an average value of detection results by the plurality of transfer-section temperature detectors 346 as the temperature in the vicinity of the transfer section detected by the transfer-section temperature detectors 346. Alternatively, the controller 31 may obtain the result of detection by one of the plural transfer-section temperature detectors 346.

Next, the controller 31 determines whether the temperature in the vicinity of the transfer section acquired in Step S6 is equal to or lower than a threshold value (Step S7). The threshold is set in advance.

If the temperature in the vicinity of the transfer section is greater than the threshold value (NO in Step S7), the controller 31 reduces the amount of heat applied to the sheet P by, for example, reducing the amount of current sent to the heat source H of the sheet heating device 20. To ensure high transferability even with a small heating amount, the controller 31 reduces the sheet conveyance speed in the transfer section during the transfer process (Step S8). The controller 31 proceeds to Step S6 of the processing.

If the temperature in the vicinity of the transfer section is lower than or equal to the threshold (YES in Step S7), the controller 31 determines whether or not the difference between the temperature inside the apparatus acquired in Step S6 and the temperature in the vicinity of the transfer section is higher than or equal to a threshold (Step S9). The threshold is set in advance.

If the difference between the temperature inside the apparatus and the temperature in the vicinity of the transfer section is equal to or greater than the threshold (YES in Step S9), the controller 31 acquires the setting value of the transfer current to be sent to the secondary transfer nip part 345 from the table of setting values of the transfer current stored in the storage section 32 (Step S10).

FIG. 7A shows the table of setting values of the transfer current.

In one or more embodiments, the sheet type of the sheet P is coated gloss sheet, and the basis weight is 257 to 300 gsm. In this case, as illustrated in FIG. 7A, the set value of the transfer current is −180 uA.

Next, based on the temperature inside the apparatus and the temperature in the vicinity of the transfer section acquired in Step S6, the controller 31 acquires a corrected value of the transfer current based on the difference between the temperature inside the apparatus and the temperature in the vicinity of the transfer section from the first correction table stored in the storage section 32 (Step S11). The corrected value of the transfer current based on the difference between the temperature inside the apparatus and the temperature in the vicinity of the transfer section is a corrected value for fluctuation of the resistance value of the transfer section due to the temperature change of the transfer section.

FIG. 7B shows the first correction table.

In one or more embodiments, the difference between the temperature inside the apparatus and the temperature in the vicinity of the transfer section is 10° C. In this case, as illustrated in FIG. 7B, the corrected value of the transfer current based on the difference between the temperature inside the apparatus and the temperature in the vicinity of the transfer section is +10 uA.

Next, the controller 31 controls the first sheet temperature detectors 24 to acquire the temperature of the surface of the sheet P before heating, and controls the second sheet temperature detectors 25 to acquire the temperature of the surface of the sheet P after heating (Step S12). The controller 31 may acquire an average value of detection results by the plurality of first sheet temperature detectors 24 as the temperature of the surface of the sheet P detected by the first sheet temperature detectors 24. Alternatively, the controller 31 may obtain the detection result of one of the plurality of first sheet temperature detectors 24. Similarly, the controller 31 may acquire an average value of the detection results by the plurality of second sheet temperature detectors 25 as the temperature of the surface of the sheet P detected by the second sheet temperature detectors 25. Alternatively, the controller 31 may obtain the detection result of one of the plurality of second sheet temperature detectors 25.

Next, the controller 31 calculates the difference between the temperatures of the surfaces of the sheet P before and after heating, which are obtained in Step S12. The controller 31 obtains a corrected value of the transfer current based on the difference between the sheet temperatures before and after heating from the second correction table stored in the storage section 32 (Step S13). The corrected value of the transfer current based on the difference between the sheet temperatures before and after the heating is a corrected value for fluctuation of the resistance value of the sheet P due to the temperature change of the sheet P.

FIG. 7C shows the second correction table.

In one or more embodiments, the difference in sheet temperature before and after heating is 15° C. In this case, as illustrated in FIG. 7C, the corrected value of the transfer value based on the difference in sheet temperature before and after heating is +12 uA.

Next, the controller 31 corrects the transfer current value on the basis of:

- the set value of the transfer current acquired in Step S10;
- the corrected value of the transfer current based on the difference between the temperature in the device and the temperature in the vicinity of the transfer section acquired in Step S11; and
- the corrected value of the transfer current based on the difference in sheet temperature before and after heating acquired in Step S13.

The controller 31 outputs the corrected transfer current value by controlling the power supply (Step S14). Specifically, as described above, in one or more embodiments, the set value of the transfer current is −180 uA. The corrected value of the transfer current based on the difference between the temperature inside the apparatus and the temperature in the vicinity of the transfer section is +10 uA. The corrected value of the transfer current based on the difference in sheet temperature before and after heating is +12 uA. In this case, the corrected transfer current value is the sum of these (−180 uA+10 uA+12 uA), i.e., −158 uA.

Next, the controller 31 determines whether or not the job is completed (Step S15).

If the job is completed (YES in Step S15), the controller 31 finishes the present processing.

If the job is not completed (NO in Step S15), the controller 31 proceeds to Step S6 of the processing.

If the difference between the temperature inside the apparatus and the temperature in the vicinity of the transfer section is smaller than the threshold value (NO in Step S9), the controller 31 proceeds to Step S15 of the processing.

In the transfer current correction processing, when the first sheet temperature detectors 24 are controlled to acquire the surface temperature of the sheet P, if the difference between the detection results of the plurality of first sheet temperature detectors 24 is equal to or greater than a predetermined value, the controller 31 may stop the job and notify a user by displaying a warning on the display part 331. The same applies when the transfer-section temperature detector 346 is controlled to acquire the temperature in the vicinity of the transfer section and when the second sheet temperature detectors 25 are controlled to acquire the temperature of the surface of the sheet P.

Figure 8:
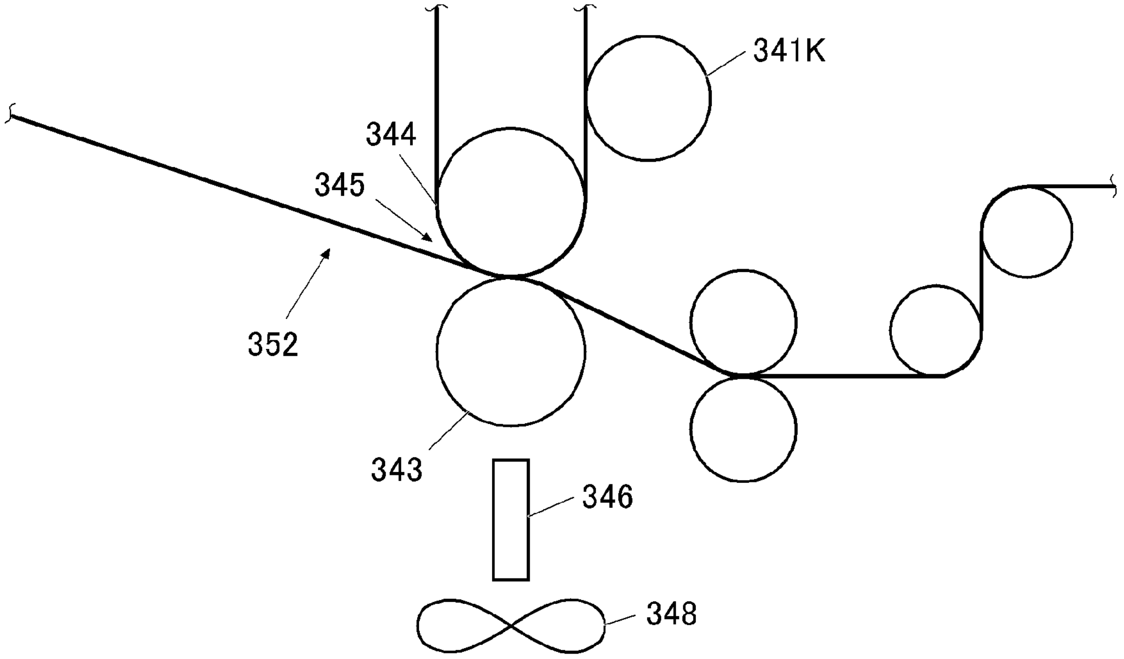
FIG. 8 shows an installation position of a cooling fan.

In Step S8 of the transfer current correction processing, the amount of heat applied to the sheet P is reduced, and the sheet conveyance speed in the transfer process at the transfer section is reduced. However, the present invention is not limited thereto. As a method for lowering the temperature in the vicinity of the transfer section, the image forming apparatus 30 may include a cooling fan 348 (cooling section) in the vicinity of the transfer section. The image forming apparatus 30 drives the cooling fan 348 to lower the temperature in the vicinity of the transfer section. FIG. 8 illustrates an installation position of the cooling fan 348 included in the image forming apparatus 30.

The amount of cooling by the cooling fan 348, which corresponds to the amount of current sent to the cooling fan 348 or the like, may be set based on the temperature in the vicinity of the transfer section.

As described above, the image forming system 100 in the above-described embodiments includes:

- the image forming apparatus 30 including:
- the transfer section (secondary transfer roller 343 and counter roller 344) for transferring a toner image onto the sheet P; and
- the fixing section 36 that fixes the toner image transferred by the transfer section to the sheet P;
- the sheet heating device 20 that heats the sheet upstream of the fixing section 36 in the sheet conveyance direction;
- the first detector (internal temperature detector 38 and transfer-section temperature detector 346) that detects the temperature in the image forming apparatus 30;
- the second detector (first sheet temperature detectors 24) that detects the temperature of the sheet P before being heated;
- the controller (controller 31) that causes the sheet heating device 20 to perform the sheet heating processing based on the detection result by the second detector and the sheet passing conditions for the sheet P; and
- the correction section (controller 31) that corrects at least one of a transfer current and a transfer voltage in the transfer section based on the detection result by the first detector in the case where the sheet heating device 20 executes the sheet heating processing.

Therefore, the image forming system 100 suppresses deterioration of the transferability of the transfer section due to the influence of heating the sheet before fixing. The image forming system 100 can provide a high-quality printed matter.

In the image forming system 100 in the embodiments described above, the first detector detects the temperature in the vicinity of the transfer section.

Therefore, the image forming system 100 can correct at least one of the transfer current and the transfer voltage in the transfer section based on the temperature in the vicinity of the transfer section.

The image forming system 100 according to the above-described embodiments includes the third detector (internal temperature detector 38) that detects the ambient temperature outside or inside the image forming apparatus 30. The correction section corrects at least one of a transfer current and a transfer voltage in the transfer section based on a difference between the detection result by the first detector and the detection result by the third detector.

Therefore, the image forming system 100 suppresses deterioration of the transferability of the transfer section even if there is fluctuation in the resistance value of the transfer section due to the temperature change of the transfer section. The image forming system 100 can provide a high-quality printed matter.

In the image forming system 100 in the embodiments described above, the first detector detects the temperature in the vicinity of the transfer section in a contactless manner, and the plurality of the first detectors are provided at intervals in the direction orthogonal to the sheet conveyance direction and parallel to the surface of the sheet P.

Accordingly, the image forming system 100 can detect the temperature in the vicinity of the transfer section more accurately.

The image forming system 100 according to the above-described embodiments includes a determination section (controller 31) that determines whether the detection result of the first detector is equal to or greater than the predetermined value. In a case where the determination section determines that the detection result by the first detector is equal to or greater than the predetermined value, the controller 31 reduces the heating amount by the sheet heating device 20 and decelerates the sheet conveyance speed.

Accordingly, in the case where the temperature in the vicinity of the transfer section is equal to or higher than the predetermined value, the image forming system 100 can lower the temperature of the transfer section by reducing the heating amount for the sheet to maintain the temperature at an appropriate temperature. The image forming system 100 can ensure good transferability even when the temperature of the transfer section is lowered.

The image forming system 100 in the above-described embodiments includes:

- the determination section (controller 31) that determines whether the detection result by the first detector is equal to or greater than the predetermined value; and
- the cooling section (cooling fan 348) that cools the vicinity of the transfer section.

If the determination section determines that the detection result by the first detector is equal to or greater than the predetermined value, the controller 31 causes the cooling section to cool the vicinity of the transfer section.

Therefore, in a case where the temperature in the vicinity of the transfer section is equal to or higher than the predetermined value, the cooling fan 348 can lower the temperature of the transfer section and keep it at an appropriate temperature.

In the image forming system 100 according to the above-described embodiments, the sheet passing conditions include at least one of the conveyance speed of the sheet P, the sheet type of the sheet P, and the basis weight of the sheet P.

Therefore, the image forming system 100 can execute more appropriate sheet heating processing based on the conveyance speed of the sheet P, the sheet type of the sheet P, and the basis weight of the sheet P.

The image forming system 100 in the embodiments described above includes the fourth detector (the second sheet temperature detectors 25) that detects the temperature of the sheet heated by the sheet heating device 20. The correction section corrects at least one of a transfer current or a transfer voltage in the transfer section based on a difference between the detection result by the second detector and the detection result by the fourth detector.

Therefore, the image forming system 100 suppresses deterioration of the transferability of the transfer section even if there is fluctuation in the resistance value of the sheet P due to temperature change of the sheet P. The image forming system 100 can provide a high-quality printed matter.

In the image forming system 100 in the embodiments described above, a plurality of second detectors and fourth detectors are provided at intervals in the direction orthogonal to the sheet conveyance direction and parallel to the surface of the sheet P.

Accordingly, the image forming system 100 can detect temperature unevenness in the width direction of the sheet.

In the image forming system 100 according to the above-described embodiments, the sheet P is a continuous sheet.

Therefore, the image forming system 100 suppresses deterioration of the transferability of the transfer section due to influence of performing the sheet heating before the fixing even for the continuous sheet for which the optimum value of a transfer current is easily deviated. The image forming system 100 can provide a high-quality printed matter.

The image forming apparatus 30 in the above-described embodiments forms an image on the sheet P heated by the sheet heating device 20. The image forming apparatus 30 includes:

- the transfer section (secondary transfer roller 343 and counter roller 344) for transferring a toner image onto the sheet P;
- the fixing section 36 that fixes the toner image transferred by the transfer section to the sheet;
- the detectors (internal temperature detector 38 and transfer-section temperature detector 346) that detect the temperature inside the apparatus;
- the acquisition section (controller 31) that acquires the temperature of the sheet P before heating;
- the controller (controller 31) that causes the sheet heating device 20 to perform the sheet heating processing based on a result of acquisition by the acquisition section and the sheet passing conditions for the sheet P; and
- the correction section (controller 31) that corrects at least one of a transfer current and a transfer voltage in the transfer section based on the detection results by the detectors in the case where the sheet heating device 20 executes the sheet heating processing.

Therefore, the image forming system 100 suppresses deterioration of the transferability of the transfer section due to the influence of heating the sheet before fixing. The image forming system 100 can provide a high-quality printed matter.

The present invention is not limited to the content of the above-described embodiments, and can be appropriately changed within the scope of the present invention.

For example, in the above-described embodiments, the second sheet temperature detectors 25 detect the temperature of the surface (one surface) of the sheet. Alternatively, a detector that detects the temperature of the back surface of the sheet may be further provided. The transfer current correction processing is executed based on the detector.

The sheet heating device 20 in the above-described embodiments has the configuration as shown in FIG. 2, but the present invention is not limited thereto. A sheet heating device that heats the sheet P by another method can be adopted.

For example, the heating method is:

- a non-contact indirect heating method in which a sheet is heated by passing through a high-temperature atmosphere;
- a non-contact direct heating method in which a sheet is heated by a heater;
- a contact heating method in which a sheet is heated by passing between a pair of high-temperature rollers; or
- a contact heating method in which a sheet is heated by passing between a pair of high-temperature belts.

In one or more embodiments, the surface temperature of the sheet P after the heating is detected by the second sheet temperature detectors 25. The present invention is not limited to this. The temperature of the surface of the sheet P between the sheet heating device 20 and the image forming apparatus 30 may be detected as the temperature of the surface of the heated sheet P. Alternatively, the temperature of the surface of the sheet P immediately before the secondary transfer in the image forming apparatus 30 may be detected. As for the surface temperature of the sheet P after heating, the temperature at a position immediately before the secondary transfer is closer to a true value. Accordingly, by detecting the temperature at the position immediately before the secondary transfer, the transfer current value can be corrected more accurately. This can ensure image quality.

In the embodiments described above, an external temperature detector that detects the ambient temperature outside the image forming apparatus 30 may be provided on the back of the image forming apparatus 30. The temperature inside the apparatus used in the transfer current correction processing is substituted by the temperature outside the apparatus or an average value of the temperature outside the apparatus and the temperature inside the apparatus.

In Step S3 of the transfer current correction processing of the above-described embodiments, the controller 31 determines whether or not to heat the sheet P by the sheet heating device 20 based on the sheet passing conditions, the temperature inside the apparatus, and the surface temperature of the sheet P. The present invention is not limited to this. The controller 31 may determine whether to heat the sheet P by the sheet heating device 20 based on only the sheet passing conditions and the surface temperature of the sheet P. That is, the controller 31 causes the sheet heating device 20 to perform the sheet heating processing based on the detection result by the second detector and the sheet passing conditions of the sheet.

In Step S4 of the transfer current correction processing of the above-described embodiments, the amount of current sent to the heat source H is set in advance based on the sheet passing conditions, the temperature inside the apparatus, and the temperature of the surface of the sheet P. The present invention is not limited to this. The amount of current sent to the heat source H may be a fixed value. The amount of heat is adjusted by switching on/off of the heat source H based on the sheet passing conditions, the temperature inside the apparatus, and the temperature of the surface of the sheet P.

In the above-described embodiments, the transfer-section temperature detector 346 may be disposed at a position other than the position illustrated in FIG. 1. For example, the transfer-section temperature detector 346 may detect the vicinity of the cleaning section 347 on the intermediate transfer belt 342 immediately after the secondary transfer. In this case, in Step S9 of the transfer current correction processing, as the threshold for determining whether or not the difference between the temperature inside the apparatus and the temperature in the vicinity of the transfer section is equal to or greater than the threshold, a threshold corresponding to the position where the transfer-section temperature detector 346 is arranged may be used. Thereby the transfer current value can be corrected more accurately. Image quality is ensured.

In Step S12 of the transfer current correction processing of the above-described embodiments, the temperature of the surface of the sheet P before heating is acquired by controlling the first sheet temperature detectors 24. The present invention is not limited to this. The temperature of the surface of the sheet P before heating may be substituted by the temperature inside the apparatus.

In Step S14 of the transfer current correction processing of the above-described embodiments, the transfer current value is corrected based on the set value of the transfer current, the corrected value of the transfer current based on the difference between the temperature inside the apparatus and the temperature in the vicinity of the transfer section, and the corrected value of the transfer current based on the difference between the sheet temperatures before and after heating. The present invention is not limited to this. The transfer current value may be corrected based on only the set value of the transfer current and the corrected value of the transfer current based on the difference between the temperature inside the apparatus and the temperature in the vicinity of the transfer section.

In Step S14 of the transfer current correction processing of the above-described embodiments, the transfer current value is corrected. The present invention is not limited to this. In Step S14, a voltage (transfer voltage) to be applied to the transfer section may be corrected. The corrected transfer voltage is applied to the transfer section.

In one or more embodiments, the sheet P is a continuous sheet. The present invention is not limited to this. The sheet P may be a long sheet or a standard-sized sheet. However, the continuous sheet has no sheet interval. While the sheet P is being heated by the sheet heating device 20, the heated sheet P is constantly in contact with the transfer section, and heat exchange is performed. Accordingly, the optimum value of the transfer current tends to deviate. Therefore, in the case where the sheet P is a continuous sheet, the effects of one or more embodiments of the present invention are more exhibited.

In one or more embodiments, the sheet heating device 20 is disposed between the sheet feed device 10 and the image forming apparatus 30. The present invention is not limited to this. The sheet heating device 20 may be disposed between the transfer section and the fixing section 36 in the image forming apparatus 30. Also in this case, the temperature of the transfer section rises due to heat generated by the sheet heating device 20. Accordingly, the effects of one or more embodiments of the present invention can be obtained.

Detailed configuration and detailed operation of the image forming system 100 may be appropriately changed within the scope of the present invention.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming system comprising:
- an image forming apparatus that comprises:
  - a transfer device that transfers a toner image onto a sheet; and
  - a fixing device that fixes the toner image transferred by the transfer device to the sheet;
- a sheet heating device that heats the sheet on an upstream of the fixing device in a sheet conveyance direction;
- an apparatus temperature detector that detects a temperature inside the image forming apparatus;
- an unheated-sheet temperature detector that detects a temperature of the sheet before the sheet heating device heats the sheet; and
- a controller that:
  - causes the sheet heating device to heat the sheet based on a detection result by the unheated-sheet temperature detector and a sheet passing condition of the sheet, and
  - corrects at least one of a transfer current and a transfer voltage in the transfer device based on a detection result by the apparatus temperature detector in a case where the sheet heating device heats the sheet, wherein
- the apparatus temperature detector detects, as the temperature inside the image forming apparatus, a temperature at the transfer device,
- the image forming system further comprises:
  - an ambient temperature detector that detects an ambient temperature outside or inside the image forming apparatus, and
- the controller corrects at least one of the transfer current and the transfer voltage in the transfer device based on a difference between the detection result by the apparatus temperature detector and a detection result by the ambient temperature detector.

2. The image forming system according to claim 1, wherein
- the apparatus temperature detector:
  - detects the temperature at the transfer device in a contactless manner, and
  - comprises detectors disposed at intervals in a direction orthogonal to the sheet conveyance direction and parallel to a surface of the sheet.

3. The image forming system according to claim 1, wherein
- the controller further:
  - determines whether the detection result by the apparatus temperature detector is equal to or greater than a predetermined value, and
  - upon determining that the detection result by the apparatus temperature detector is equal to or greater than the predetermined value, reduces a heating amount by the sheet heating device and decelerates a sheet conveyance speed.

4. The image forming system according to claim 1, further comprising:
- a cooling fan that cools the temperature at the transfer device, wherein
- the controller further:
  - determines whether the detection result by the apparatus temperature detector is equal to or greater than a predetermined value, and
  - upon determining that the detection result by the apparatus temperature detector is equal to or greater than the predetermined value, causes the cooling fan to cool the temperature at the transfer device.

5. The image forming system according to claim 1, wherein
- the sheet passing condition includes at least one of a sheet conveyance speed, a sheet type, and a basis weight of the sheet.

6. The image forming system according to claim 1, wherein the sheet is a continuous sheet.

7. An image forming system comprising:
- an image forming apparatus that comprises:
  - a transfer device that transfers a toner image onto a sheet; and
  - a fixing device that fixes the toner image transferred by the transfer device to the sheet;
- a sheet heating device that heats the sheet on an upstream of the fixing device in a sheet conveyance direction;
- an apparatus temperature detector that detects a temperature inside the image forming apparatus;
- an unheated-sheet temperature detector that detects a temperature of the sheet before the sheet heating device heats the sheet;
- a controller that:
  - causes the sheet heating device to heat the sheet based on a detection result by the unheated-sheet temperature detector and a sheet passing condition of the sheet, and
  - corrects at least one of a transfer current and a transfer voltage in the transfer device based on a detection result by the apparatus temperature detector in a case where the sheet heating device heats the sheet; and
- a heated-sheet temperature detector that detects a temperature of the sheet after the sheet heating device heats the sheet, wherein
- the controller corrects at least one of the transfer current and the transfer voltage in the transfer device based on a difference between the detection result by the unheated-sheet temperature detector and a detection result by the heated-sheet temperature detector.

8. The image forming system according to claim 7, wherein
- each of the unheated-sheet temperature detector and the heated-sheet temperature detector comprises detectors disposed at intervals in a direction orthogonal to the sheet conveyance direction and parallel to a surface of the sheet.

9. An image forming apparatus that forms an image on a sheet, comprising:
- a transfer device that transfers a toner image onto a sheet;
- a fixing device that fixes the toner image transferred by the transfer device to the sheet;
- an apparatus temperature detector that detects a temperature inside the image forming apparatus; and
- a controller that:
  - acquires a temperature of the sheet before a sheet heating device heats the sheet,
  - causes the sheet heating device to heat the sheet based on the acquired temperature and a sheet passing condition of the sheet, and corrects at least one of a transfer current and a transfer voltage in the transfer device based on a detection result by the apparatus temperature detector in a case where the sheet heating device heats the sheet, wherein the apparatus temperature detector detects, as the temperature inside the image forming apparatus, a temperature at the transfer device, the image forming system further comprises:

an ambient temperature detector that detects an ambient temperature outside or inside the image forming apparatus, and the controller corrects at least one of the transfer current and the transfer voltage in the transfer device based on a difference between the detection result by the apparatus temperature detector and a detection result by the ambient temperature detector.

10. A non-transitory recording medium storing instructions for a computer of an image forming system, wherein:

the image forming system comprises:

an image forming apparatus that comprises:

a transfer device that transfers a toner image onto a sheet; and a fixing device that fixes the toner image transferred by the transfer device to the sheet;

a sheet heating device that heats the sheet on an upstream of the fixing device in a sheet conveyance direction;

an apparatus temperature detector that detects a temperature inside the image forming apparatus; and an unheated-sheet temperature detector that detects a temperature of the sheet before the sheet heating device heats the sheet, the instructions cause a computer of the image forming system to function as:

a controller that:

causes the sheet heating device to heat the sheet based on a detection result by the unheated-sheet temperature detector and a sheet passing condition of the sheet, and corrects at least one of a transfer current and a transfer voltage in the transfer device based on a detection result by the apparatus temperature detector in a case where the sheet heating device heats the sheet, the image forming system further comprises:

an ambient temperature detector that detects an ambient temperature outside or inside the image forming apparatus, and the controller corrects at least one of the transfer current and the transfer voltage in the transfer device based on a difference between the detection result by the apparatus temperature detector and a detection result by the ambient temperature detector.

* * * * *